Patented Mar. 19, 1940

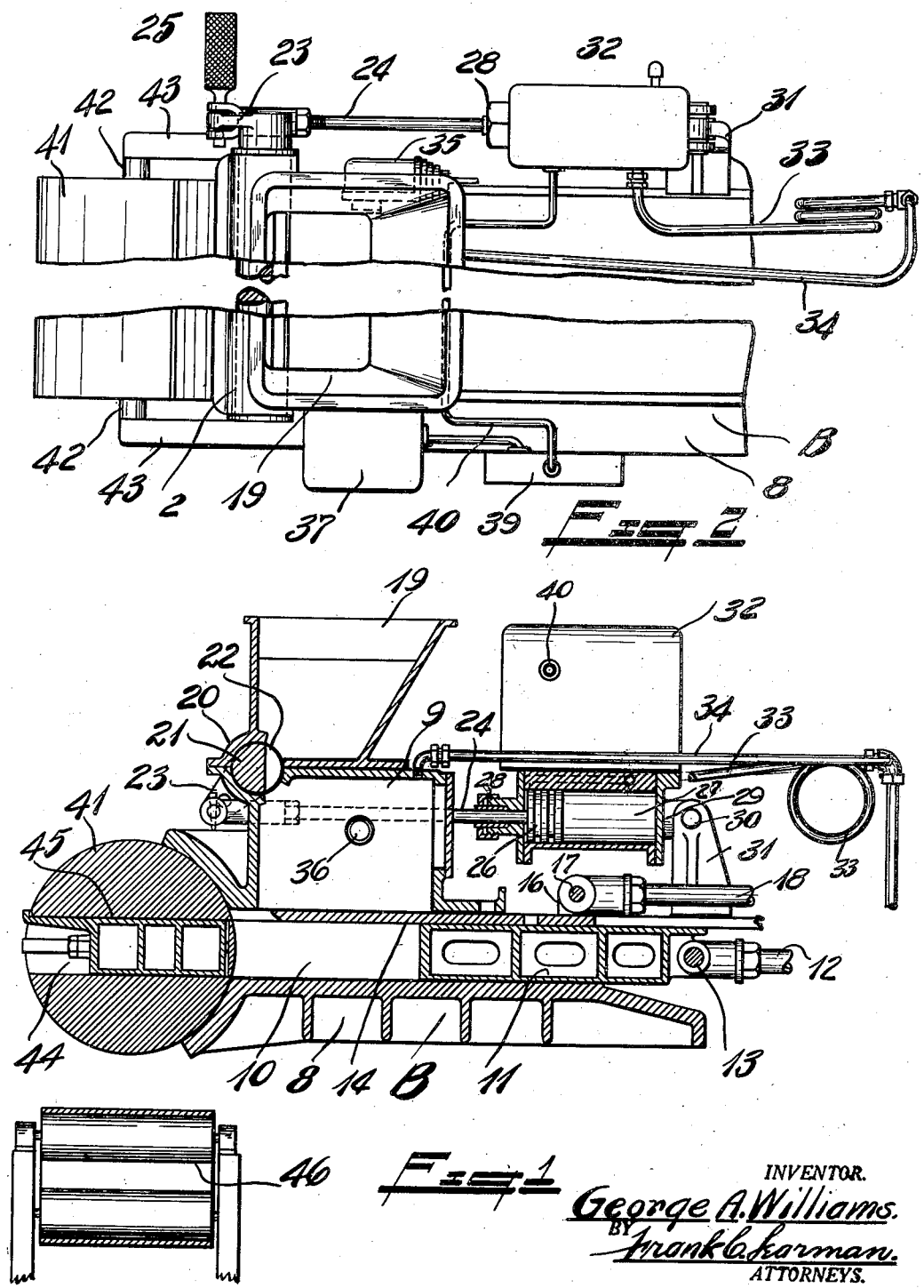

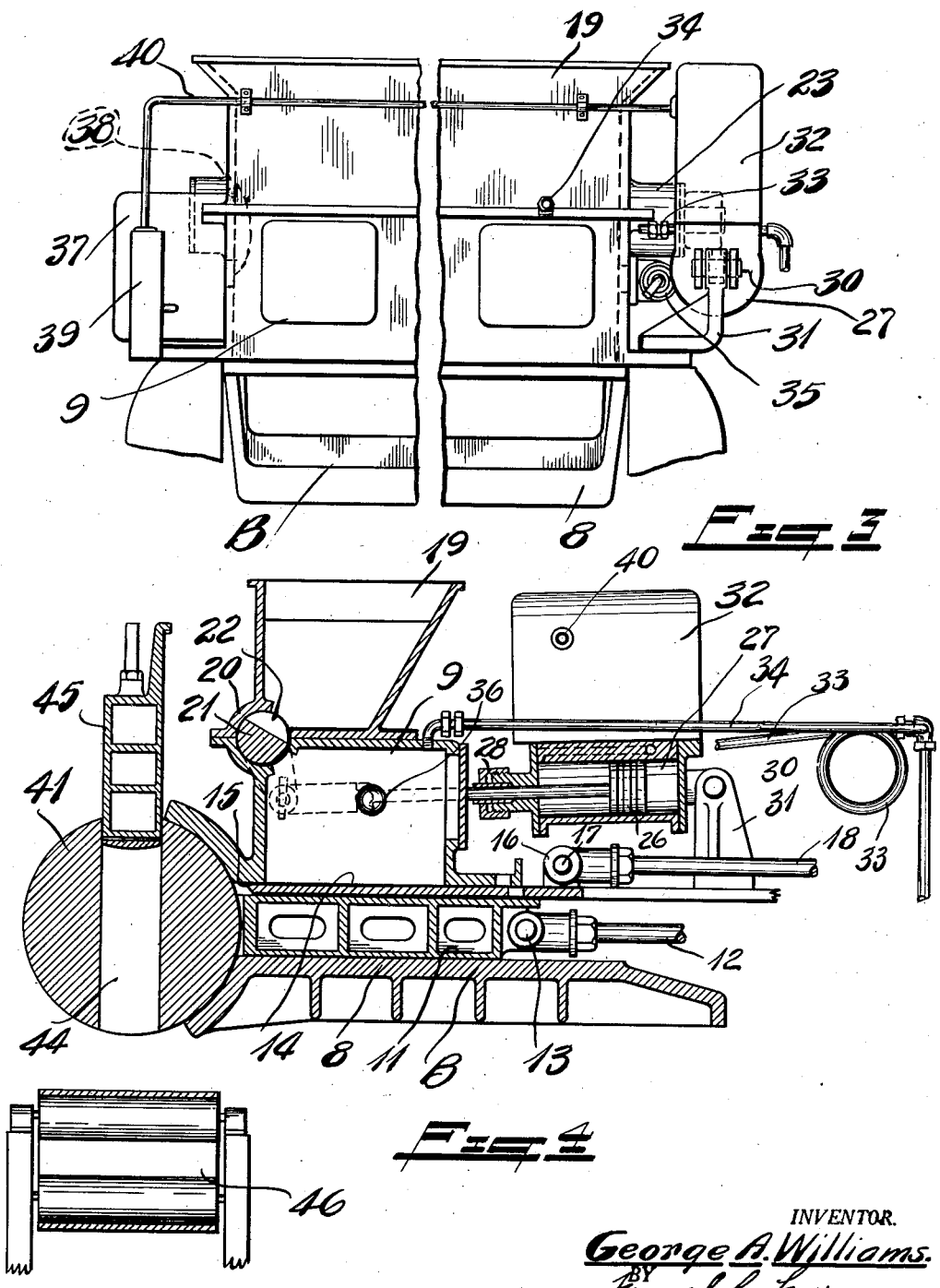

2,194,107

UNITED STATES PATENT OFFICE 2,194,107

METHOD OF TREATING DOUGH

George A. Williams, Bay City, Mich.

Application December 2, 1938, Serial No. 243,520

2 Claims. (Cl. 107—54)

This invention relates to a method of treating dough, and more particularly to a method whereby the dough is subjected to a vacuum prior to the scaling and/or dividing operation.

One of the prime objects of the invention is to provide a method of treating dough after fermentation has taken place and prior to the panning, so that all fermentation gases and gas pockets are removed, leaving a substantially solid mass which can be very accurately scaled as to weight, thus providing baked loaves of uniform texture, size, and accurate weight.

Another object of the invention is to provide a method of drawing the dough into a vacuum chamber in a thin ribbon and removing all the gas and/or air pockets from the dough as it enters the chamber after the fermentation period, and expelling the gas from the vacuum chamber.

A further object of the invention is to provide a method of treating dough which can be incorporated in new machines, as well as in machines already on the market and at present in use.

A still further object is to provide a method of treating dough so that the weight and size of the loaves can be accurately controlled, and so that the baked product will have a fine uniform texture.

With the above and other objects in view, the present invention consists in the combination and arrangement of parts, hereinafter more fully described, illustrated in the accompanying drawings, and more particularly pointed out in the appended claims, it being understood that changes may be made in the form, size, proportions, and minor details of construction, without departing from the spirit, or sacrificing any of the advantages of the invention.

In the drawings:

Fig. 1 is a fragmentary sectional side elevational view of a dough divider incorporating my method of treatment.

Fig. 2 is a top plan view thereof.

Fig. 3 is an end view.

Fig. 4 is a view similar to Fig. 1 showing vacuum chamber closed, and the division box in position for discharging the divided or sealed dough.

In conventional dough dividers at present on the market, it is very difficult to accurately control the weight of dough pieces, and this is due to the fact that some batches of dough contain more gas than others, which gas is created during the fermentation period. Furthermore, certain portions of each batch may contain more gas than others, and this is due to the fact that fermentation continues to take place in the dough batch while it is being scaled, consequently, the last part of the batch will contain more gas than the first part, and one batch of dough may be more dense than the next batch, and the weight of the loaves from the various batches will, therefore, vary anywhere from one to four tenths ounces.

The laws governing baking and baking establishments require that each loaf be full weight as marked or set by the proper authority; therefore, any excess weight is a direct loss to the baker, and my improved method eliminates such loss, because it insures the density of the dough, and consequently the relation of volume to weight, also since the carbon dioxide gas is separated from the dough as the dough enters the vacuum chamber in a thin ribbon and the gas then is expelled from said chamber, there will be a marked improvement to the flavor of the finished loaf.

Broadly the invention is directed to the idea of removing all gas from the dough after the fermentation period, and in the present instance I have shown my method applied at the point in the machine where the dough is divided, but it will be understood that the vacuum can be applied prior to the dough entering the divider if found necessary or desirable, or just before it enters the moulder where it is prepared for panning.

Referring now more specifically to the drawings in which I have shown my improved method embodied in a conventional dough divider indicated at "B", said machine comprising a top box 8, and a vacuum reservoir 9, a longitudinally disposed ram passage 10 is interposed between said top box and reservoir, and a ram member 11 is reciprocatingly mounted therein, a connecting rod 12 being pivotally connected to the one end of the ram at the point 13, and is actuated from any source of power (not shown).

A knife 14 is mounted in the bottom wall of the reservoir 9, and the outer end is shaped to form a cutting edge 15 as shown, a lug 16 being provided on the opposite end, and a pin 17 serves to connect said knife to a connecting rod 18 for reciprocation in the same manner as the ram.

A charging hopper 19 is mounted on the reservoir 9, and into which the dough is loaded as it comes from the dough mixer (not shown). A cylindrical valve housing 20 is formed in the end walls of the reservoir and charging hopper respectively, and a rotary control valve 21 is mounted therein, said valve being formed with a port 22, which, when in certain position, establishes communication between the charging hopper and the reservoir. A crank 23 is provided on one end of the valve 21, and an operating rod 24 is pivotally connected thereto by means of the adjustable pin 25, the opposite end of said rod being connected to a piston 26, which is reciprocatingly mounted in a cylinder 27.

A stuffing box 28 is provided on the one end of the cylinder 27 to provide a leakproof connection, the opposite end of the cylinder being formed with a lug 29, and a pin 30 serves to connect said cylinder to a bifurcated lug 31 provided on the base of the machine.

A conventional four-way solenoid air valve 32 is mounted on the cylinder 27, and a vacuum line 33 opens into said cylinder and leads to a compressor (not shown), which can be located at any point convenient to the machine.

A branch line 34 leads to the vacuum reservoir 9, and thence leads to a compressor in the usual manner, so that all gas and air can be removed from the dough when the reservoir is closed and the vacuum is applied.

A suitable and conventional light source 35 is mounted on the side wall of the reservoir 9 in alignment with the opening 36, and a conventional electric eye 37 is mounted on the opposite wall in alignment with the opening 38, these openings 36 and 38 being so located, that the light beam from the light source will influence the electric eye, said eye being connected to a control panel 39 and thence the wire 40 leads to the solenoid air valve 32 in the usual manner.

Dough is admitted to the reservoir 9 through the valve in a continuous ribbon, and whenever dough fills the reservoir 9 to the point where it intercepts the light beam from the light source 35, the electric eye 37 will actuate the solenoid air valve and cause the piston 26 to move rearwardly in the cylinder and turn the valve 21 to closed position as shown in Fig. 4 of the drawings, until such time as the dough level in the machine falls below the level of the light beam, the knife 14 and ram 11 operate to divide the dough pieces by forcing the dough into the pocket of the division box 41.

The cylindrical division box 41 is mounted on the front end of the machine and is formed with hubs 42 which are journaled in arms 43 projecting from the machine, the end walls of the top box and reservoir respectively being shaped to accommodate said division box.

A transversely disposed passage or pocket 44 is provided in the division box 41, and a piston 45 is slidably mounted in said passage, so that when the dough, cut by the knife 14 is forced into the division box pockets by action of the ram 11, the piston 45 moves outwardly against an adjustable stop (not shown) to accommodate the dough, after which the box is rotated ninety degrees to position shown in Fig. 4 to bring the piston to vertical position, this piston is then actuated to force the scaled dough out of the division box pocket and onto a conveyer 46 to be conveyed to a rounder or other baking appliance (not shown).

In practice the dough is loaded into the charging hopper 19 and when the valve 21 is in open position with the line 34 open to create a vacuum in the chamber 9, this dough will be drawn into the vacuum chamber in the form of a ribbon, the vacuum immediately removes all fermentation gases and expels them and when the chamber is filled to a point where the dough intercepts the light beam from the light source 35 to the electric eye 37, the solenoid air valve 32 will be actuated to close the valve 21 and cut off the admission of dough to the chamber 9 until such time as the knife and ram remove sufficient dough to again establish the light beam, when the action of electric eye again actuates the solenoid to open the valve.

It will, of course, be obvious that a suitable switch (not shown) must be provided for holding the valve 21 in closed position when running the last portion of each batch; otherwise the valve would remain open when there was no dough in the charging hopper, and this would destroy the vacuum in the vacuum chamber.

For a clear understanding of the present process it should be understood that the first fermentation period or first proofing covers the period when the dough is subjected to fermentation after the mixing operation, and before the makeup period. The final proofing or recovery period is after the dough has been made up into loaves and before it is placed in the oven to be baked.

The vacuum process is applied after the first fermentation period and before the recovery period sets in.

What I claim is:

1. A method of treating dough which comprises subjecting said dough to a vacuum sufficient to remove the excess fermentation gases therefrom after the first proofing, and prior to the time it is placed in pans for the final proofing.

2. A method of treating dough which consists in drawing the dough into a vacuum chamber in a thin ribbon like strip and subjecting said strip to a vacuum sufficient to remove the excess gases therefrom after the first proofing takes place and before the recovery period sets in.

GEORGE A. WILLIAMS.